(12) United States Patent
Rindborg et al.

(10) Patent No.: US 7,370,211 B2
(45) Date of Patent: May 6, 2008

(54) ARRANGEMENT AND METHOD OF EXECUTION OF CODE

(75) Inventors: Tom Rindborg, Stockholm (SE); Joacim Halén, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 827 days.

(21) Appl. No.: 10/490,227

(22) PCT Filed: Sep. 21, 2001

(86) PCT No.: PCT/SE01/02033

§ 371 (c)(1),
(2), (4) Date: Mar. 19, 2004

(87) PCT Pub. No.: WO03/028283

PCT Pub. Date: Apr. 3, 2003

(65) Prior Publication Data

US 2004/0243810 A1   Dec. 2, 2004

(51) Int. Cl.
H04L 9/32 (2006.01)
G06F 12/14 (2006.01)
G06F 11/30 (2006.01)

(52) U.S. Cl. ...................... 713/191; 713/176
(58) Field of Classification Search ............... 713/176, 713/191
See application file for complete search history.

(56) References Cited

U.S. PATENT DOCUMENTS

| | | | | |
|---|---|---|---|---|
| 5,793,028 A | * | 8/1998 | Wagener et al. | 235/380 |
| 5,903,651 A | * | 5/1999 | Kocher | 713/158 |
| 6,006,328 A | * | 12/1999 | Drake | 726/23 |
| 6,058,482 A | * | 5/2000 | Liu | 726/23 |
| 6,126,328 A | * | 10/2000 | Mallory et al. | 717/114 |
| 6,138,239 A | * | 10/2000 | Veil | 726/10 |
| 6,141,793 A | * | 10/2000 | Bryant et al. | 717/115 |
| 6,259,447 B1 | * | 7/2001 | Kanetake et al. | 715/764 |
| 6,389,537 B1 | * | 5/2002 | Davis et al. | 713/187 |
| 6,405,317 B1 | * | 6/2002 | Flenley et al. | 726/4 |
| 6,609,199 B1 | * | 8/2003 | DeTreville | 713/172 |
| 6,629,244 B2 | * | 9/2003 | Davis et al. | 713/187 |
| 6,651,171 B1 | * | 11/2003 | England et al. | 713/193 |
| 6,698,015 B1 | * | 2/2004 | Moberg et al. | 717/154 |
| 6,779,718 B1 | * | 8/2004 | Wlodarczyk | 235/380 |
| 6,820,199 B2 | * | 11/2004 | Wheeler et al. | 713/170 |
| 6,832,317 B1 | * | 12/2004 | Strongin et al. | 713/182 |
| 7,013,481 B1 | * | 3/2006 | Ellison et al. | 726/4 |
| 7,013,484 B1 | * | 3/2006 | Ellison et al. | 726/26 |
| 7,020,772 B2 | * | 3/2006 | England et al. | 713/166 |
| 7,055,029 B2 | * | 5/2006 | Collins et al. | 713/161 |

(Continued)

Primary Examiner—Nasser Moazzami
Assistant Examiner—David Garcia Cervetti

(57) ABSTRACT

The present invention relates to systems (1) and a method for executing code. According to the method a non-critical code portion is executed on a computer (3). When an application (5) on the computer detects a critical code portion to be executed, the application sends a request to a secure execution unit (4) connected to the computer to execute the critical code portion. The secure execution unit (4) executes the critical code portion in response to the request. Thereafter the secure execution unit authenticates the result of the execution of the critical code portion using a secret key (7). The authentication allows for another party (2) to verify that the execution was carried out in a trusted way. An advantage of the present invention is that it provides a reliable execution environment that can be trusted to execute critical code.

35 Claims, 3 Drawing Sheets

U.S. PATENT DOCUMENTS

| | | | |
|---|---|---|---|
| 7,065,654 B1 * | 6/2006 | Gulick et al. | 713/193 |
| 7,089,418 B1 * | 8/2006 | Ellison et al. | 713/166 |
| 7,124,101 B1 * | 10/2006 | Mikurak | 705/35 |
| 7,139,915 B2 * | 11/2006 | DeTreville | 713/172 |
| 7,194,634 B2 * | 3/2007 | Ellison et al. | 713/190 |
| 7,302,587 B2 * | 11/2007 | El Fassi et al. | 713/192 |

\* cited by examiner

ARRANGEMENT AND METHOD OF EXECUTION OF CODE

FIELD OF THE INVENTION

The present invention relates to code execution in general. In particular, the invention relates to systems and a method for executing code in a secure fashion.

BACKGROUND OF THE INVENTION

Computers of today can not be trusted to one hundred percent. Computers contain software that easily can be tampered with. Programs can be written that secretly alter the computer's actions. Well-known examples are the plethora of viruses that constantly plague computer users all over the world. The viruses replicate themselves and often destroy information or modify computer programs to perform harmful actions. Thus in a client-server situation the server cannot trust code residing in the client to do what it is supposed to do, or even trust that the code that is supposed to be executed actually is executed on the client. A piece of code on the client may easily be modified to do something other than it is supposed to do or to do something in addition to what it is supposed to do. It is possible that the code is modified to do something malicious that may cause trouble on the client side and/or server side without a user of the client noticing anything. The server has no control over the execution environment on the client side. For this reason the client-server relationship is usually arranged so that all code that performs something even remotely sensitive is executed on the server side. In this way the server has control over the execution of all code portions that are considered to be critical for some reason.

Many large software manufacturers of today sign their code digitally to make it possible to ensure that the code has not been tampered with. However, when the code is executed in an environment that is not secure, the signed code may be exchanged for another piece of code. The memory of a conventional computer, where the code resides, may be modified e.g. using direct memory access, and as a result an executing program, although digitally signed, may execute differently from what was initially intended. Many operating systems are provided with protective mechanisms to prevent tampering. But conventional operating systems are insecure environments and it is thus possible to manipulate the protective mechanisms.

SUMMARY OF THE INVENTION

The present invention tackles the above stated problem associated with the fact that a conventional computer is not an execution environment that can be trusted.

An object of the present invention is thus to provide a system for executing code in a secure way. Another object of the present invention is to provide a method for executing code in a secure way.

The above-mentioned objects of the present invention are achieved by the inventive features that are stated in the accompanying claims.

The present invention solves the problem mentioned above by means of providing a secure execution unit in connection with a computer. Code portions considered to be critical are executed in the secure execution unit. The secure execution unit has means for authenticating the result of an execution using a key that is only known to the secure execution unit The authentication of the execution result makes it possible for another party, for instance a server, to verify that the critical code portions have been executed in a trusted unit, which implies that the execution was carried out correctly, i.e. that the critical code portions that were supposed to be executed actually were executed without having been modified or replaced by other code portions.

The present invention particularly relates to a system for executing code. The system includes a computer and a secure execution device connected to the computer. The secure execution device is arranged to execute code portions that have been classified as critical. The criteria for classifying a code portion as critical may vary for different cases. The choice of which code portions to consider as critical and which to consider as non-critical depends on the level of security that it is of interest to achieve. The computer can be trusted to execute non-critical code portions on its own. However when an application on the computer encounters a code portion that is classified as critical it is arranged to send a request to the secure execution unit to execute the critical code portion. The secure execution unit stores a secret key, which is only known to the secure execution unit. The secure execution unit is arranged to authenticate the result of a code portion that it has executed using the secret key. The authentication can be seen as a receipt that ascertains that the code portion has been executed and that it was executed in a secure environment so that the result can be trusted. Another party, for instance a server, that wants to make sure that the critical code portion has been executed and that the result can be trusted may be provided with a public key that matches the secret key of the secure execution unit and that makes it possible for the other party to verify that the execution was carried out in a trusted way.

The present invention also relates to a method for executing code. According to the method a non-critical code portion is executed on a computer. When an application on the computer detects a critical code portion to be executed, the application sends a request to a secure execution unit connected to the computer to execute the critical code portion. The secure execution unit executes the critical code portion in response to the request. Thereafter the secure execution unit authenticates the result of the execution of the critical code portion using a secret key. The authentication allows for another party to verify that the critical code portion was executed correctly as described above.

An advantage of the present invention is that it provides a reliable execution environment that can be trusted to execute critical code. This may be advantageous in a client-server system, where execution of critical code reliably can be distributed locally in the clients if the clients are provided with the reliable execution environment according to the present invention. The present invention makes it possible for the server to trust the execution that is carried out in the clients.

Another advantage of the present invention is that if more code reliably can be distributed locally, the performance of the client-server system may increase due to the fact that the execution load on the server decreases.

Yet another advantage of the present invention is that it makes it possible to detect tampering with regard to execution of critical code. Embodiments of the present invention make it possible to verify that a piece of critical code has been executed, that it was executed in a trusted environment and that it hasn't been tampered with. According to one embodiment of the present invention time-stamping makes it possible to detect so-called replay attacks, when a result of an old execution is used to make pretence of being the result of a recent execution. According to another embodiment of the present invention sequence numbering of critical code portions makes it possible to check that critical code portions are carried out in the right order.

A further advantage of the present invention is that the present invention may provide increased reliability with respect to several parties of a system. As explained above the server in a client-server system may by means of the invention trust the client to execute critical code. But the invention also makes it possible for the user of the client to trust his equipment to perform as intended. According to an embodiment of the present invention it is possible to check the validity of parameter values to the critical code, which brings reliability of execution to a yet higher level.

The invention will now be described with the aid of preferred embodiments and with reference to accompanying drawings.

DETAILED DESCRIPTION OF SPECIFIC EMBODIMENTS

Figure 1:
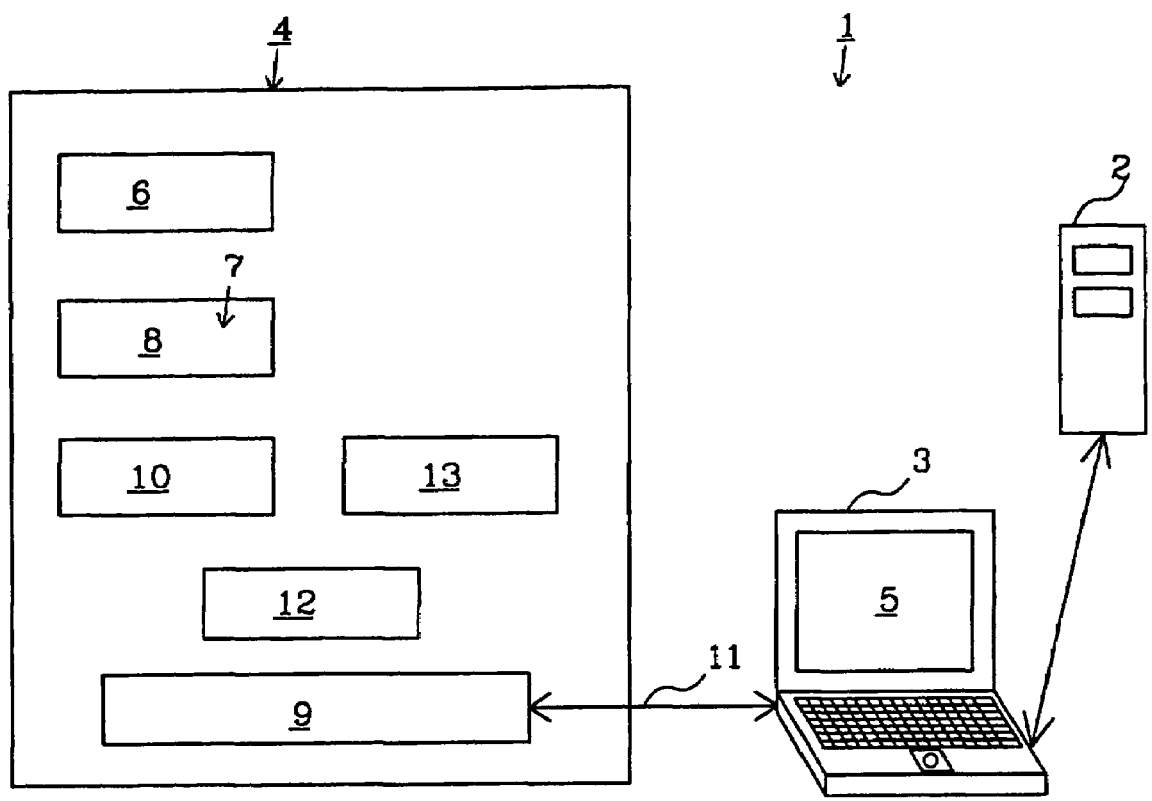
FIG. 1 is a schematic block diagram that shows a client-server system that includes a secure execution unit according to an embodiment of the present invention.

FIG. 1 shows a client-server system 1, which includes a server 2 and a client that is a general-purpose computer 3. The server may be a server of a service provider through which the service provider provides a number of services. As discussed above the computer 3 is fairly unreliable since it easily can be tampered with. Therefore the server 2 generally does not trust the computer 3 to execute code that is essential to fulfill the services that the server provides. Such essential code may be called service critical code or merely critical code.

In order to establish a secure execution environment, to which the server reliably can distribute the execution of critical code, the invention provides a secure execution unit 4 that is connected to the computer. The function and purpose of the secure execution unit will be explained in greater detail below.

In a computer program some code portions are more important or more sensitive than others are. They may for instance be considered to be important or sensitive since the result of the program execution may be seriously altered if such a code portion is tampered with. Here the terms "critical code" and "non-critical code" are used. What is considered to be critical and non-critical code may depend on the type of program and the desired level of security. The idea of the present invention is that critical code is executed in the secure execution unit 4 while non-critical code is executed in the normal execution means of the computer 3. The person implementing the code can select which code portions he wants to be executed in the secure execution unit and which he trusts the computer to execute. In the client-server system 1 the normal case is that code that causes something to be performed or changed in the server is considered to be critical. Arrangements must be made so that an application 5 on the computer can detect when a critical code portion is to be executed. One way of recognizing critical code portions is to divide the code in two separate parts; one part with non-critical code and one part with critical code. All calls to code in the critical code part are written such that the application recognizes that the call is a call to critical code. Another way of recognizing critical code portions is to provide the critical code portions with some kind of identity numbers that indicate that the code portions are critical.

Figure 2:
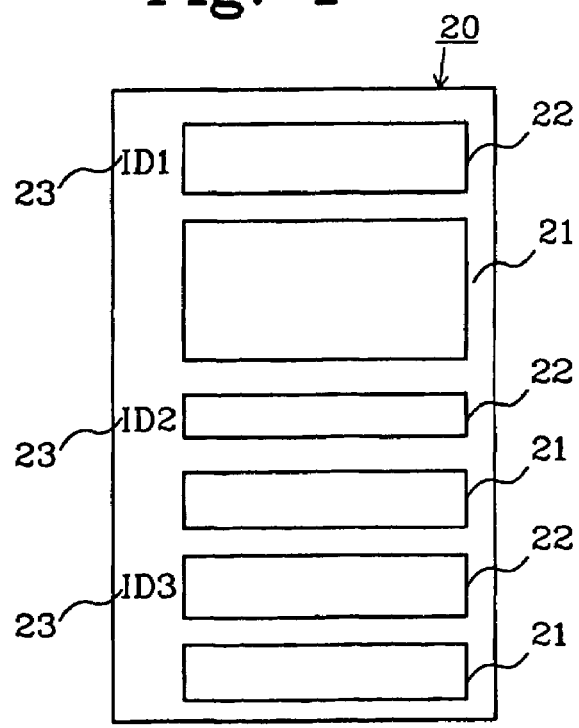
FIG. 2 is a simplified schematic block diagram that illustrates a piece of code comprising critical and non-critical code portions.

FIG. 2 shows a simplified schematic block diagram that illustrates a piece of code 20, comprising non-critical code portions 21 and critical code portions 22. The critical code portions each have an identity number 23 that identifies the code portion and possibly also indicates that the code portion is critical. Other ways of marking the code are possible, what is important for the purpose of the invention is simply that critical code portions can be recognised as such.

As mentioned above critical code portions are, according to the invention, executed in the secure execution unit 4. It is therefore important that the secure execution unit is essentially tamper proof. This can be achieved by means of implementing the secure execution unit as hardware unit that is sealed in its entirety and that is arranged to operate according to instructions that are frozen. That means that the instructions are stored such that they cannot be altered by means of normal reprogramming. "Normal reprogramming" is here intended to mean the kind of programming action that takes place without physically opening the secure execution unit 4 and manipulating its components, i.e. programming using electrical signals that are received and interpreted by the secure execution unit 4. The secure execution unit 4 can be turned into a frozen environment by means of storing the instructions that govern the function of the unit in permanent memory such as ROM (Read Only Memory) or implement them in hardware. Alternatively the secure execution unit 4 is implemented to work according to a combination of hardware implemented instructions and instructions stored in permanent memory. It is also possible to store the instructions in EPROM (Erasable and Programmable Read Only Memory). The EPROM only allows reprogramming by means of physical manipulation of the hardware of the memory, which would require taking the secure execution device apart. The idea behind implementing the secure execution unit 4 in this way is to make it as tamper proof as possible. If the instructions that govern how the unit works are frozen it is impossible to change the function of the secure execution unit by means of simple reprogramming of software.

In the future, it may be possible to store the processor instructions in other ways than the examples mentioned above, which offer the same type of frozen environment as for instance ROM and EPROM.

The secure execution unit 4 includes means for executing critical code portions, such as a processor 6. The processor instructions for executing the critical code portions are preferably frozen as mentioned above in order reduce the risk of the processor being tampered with such that it e.g. alters the critical code portions. The processor 6 includes the functionality that is required to execute the critical code portions.

The secure execution unit 4 further includes means for storing a secret key 7 and means for authenticating a result of an executed critical code portion using the secret key 7.

The result can be authenticated by means of encrypting and/or digitally signing the result using the secret key 7. Means for encryption and/or creating a digital signature are known per se and will therefore not be explained in detail here. Such means may for instance comprise a key and certificate storage 8 and a clock unit 12. In the storage 8 may the secret key 7 be stored. The clock unit may be used for providing the authenticated result with a time stamp in a manner known to a person skilled in the art. Time stamping is advantageous since it allows for detection of replay attacks, i.e. an attempt to use an old authenticated result several times, which may be harmful to the system 1.

The processor 6 may be arranged to perform the calculations that are necessary in order to digitally sign and/or encrypt the result. The secure execution unit 4 may optionally be arranged to include a so-called crypto engine 10. The crypto engine 10 is a processor or a hardware unit particularly adapted to perform encryption-related calculations. The crypto engine 10 is thus particularly suited to relieve the processor 6 of the calculations that are necessary in order to digitally sign and/or encrypt the result.

The device secure execution unit 4 further includes a memory 13 for storing one or several critical code portions to be executed.

The secure execution unit 4 also includes a communication interface 9. The communication interface 9 is used to communicate with external units such as the computer 3 via a communications link 11. The computer 3 can access the functionality of the secure execution unit through the communication interface, which may be defined by an API (Application Programming Interface). The communications link 11 may be a wireline connection established on a cable, or a wireless connection. The communication interface 9 may be arranged for communication according to well-known communications standards such as Bluetooth, USB, Ethernet, IrDA, Wireless LAN, RS232 and Firewire. The secure execution unit 4 needs to be able to communicate with external units, since it needs to receive the critical code portions to be executed and to send the authenticated execution result to a suitable receiver (such as the computer 3). This is made possible by the communication interface 9.

The secure execution unit 4 may optionally be arranged to use encryption when communicating via the communication interface 9. If the device includes a crypto engine 10, the crypto engine 10 may be arranged to handle the encryption and decryption of communicated information. Otherwise the processor 6 handles the encryption and decryption involved. The secure execution unit 4 may be implemented to store distinct sets of cryptographic keys used in connection with communication with different applications and for different purposes. The reason for using encrypted communication is not to make the execution and authentication procedure itself safer but to prevent other parties from "listening in" on what code portions are executed and what the result is. The execution and authentication procedure that takes place in the secure execution unit 4 is thus just as safe irrespective of whether encrypted communication is used or not in the communication interface 9.

The secure execution unit provides a tamper proof execution environment for executing critical code portions, but in order to achieve a high level of security and trust in the system, it is important that the critical code portions also are tamper proof. One way of achieving this is by means of the service provider arranging the critical code portions to contain proof that they actually are issued by the service provider. This can be achieved by the critical code portions being digitally signed by the service provider. Such proof benefits both the service provider who knows that tampering with the code will to be detected, and the user who can trust that the code actually is issued by the service provider. Another way of making the critical code portions tamper proof is to encrypt them using a private key of the service provider. Yet another way of making the critical code portions tamper proof is to store them in ROM memory or another type of permanent memory that can be directly accessed by the secure execution unit.

The service critical code may also be encrypted with the public key that corresponds to the secret key of the secure execution unit in order to increase security. The critical code portions can then be decrypted only in the secure execution unit. This type of encryption means that prying eyes cannot see what the code does, and they cannot try to execute the code in another environment outside the secure execution unit 4. However, it should be noted that this type of encryption is not vital to the invention.

The secure execution unit 4 is essentially tamper proof since it constitutes a frozen environment. The only possibility to manipulate the secure execution unit 4 is to manipulate its hardware, for instance by means of replacing circuits in the unit with other circuits. In order to make manipulation even more difficult, it is advantageous to implement the secure execution unit with a sealed body. Thereby a legitimate user can suspect manipulation if he detects that the seal is broken.

As mentioned above the non-critical code portions can according to the invention be executed in the normal execution means of the computer 3, but the critical code portions must be executed in the secure execution unit 4 in order to obtain the high level of security that is the aim of the invention. However, provided that the critical code portions are arranged to be tamperproof as discussed above, the critical code portions may be stored outside the secure execution unit 4 between uses without adversely affecting the security and integrity of the service to which the code relates. The critical code portion may for instance be stored in the computer and be sent to the secure execution unit when the application 5 requires that it is executed. The critical code portion is then executed in a secure manner in the secure execution unit and the execution result is authenticated by means of the secret key 7. According to this embodiment where the critical code portion to be executed is sent to the secure execution unit 4 when it is to be executed, there is no need to store the critical code portion in the secure execution unit after it has been executed. The critical code portion can thus be erased from the memory 13 after it has been executed.

According to an alternative embodiment of the present invention some or all critical code portions are stored in the memory 13 of the secure execution unit and when a critical code portion is to be executed the application sends a request to the secure execution unit to execute the particular code portion. In this case when the critical code portion already is stored in the secure execution unit 4 there is no need for the application to send the critical code portion each time it is to be executed. It suffices to send a request with information that identifies the particular code portion to be executed.

According to yet another alternative embodiment of the present invention some or all critical code portions are stored in separate memory such as compact flash, a diskette, a smart card or a memory stick. The secure execution unit must then be provided with the appropriate means for reading the critical code from the separate memory.

The present invention makes it possible to provide a local execution environment that can be trusted by the server 2. Thus it is possible for the server to reliably distribute both non-critical and critical code to the computer 3. The invention makes it easier for the server to detect tampering. As mentioned above the result of execution of a critical code portion is authenticated by means of the secret key 7 in the secure execution unit 4. The authenticated result is then returned to the application 5 on the computer 3, which sends it to the server. The server is according to the invention provided with means for checking the authenticated result and verifying that the execution was carried out in a trusted way. For instance if the result has been authenticated by means of encrypting it using the secret key 7, the server may be provided with decrypting means and a public key that matches the secret key and makes it possible to decrypt the result. If the server can decrypt the result with the public key it is verified that the execution was carried out in the secure execution unit since it is the only unit that knows the secret key 7. If the server knows that the execution was carried out in the secure execution unit it can trust the result to be correct since the secure execution unit is reliable.

When the term correct is used herein to describe a result or an execution it means that the result or the execution is correct in the meaning that it relates to the right code portion and not to a code portion that has been tampered with. If the right code portion was coded in the wrong way initially it will of course lead to an erroneous result. The present invention does not provide any means for detecting such initial coding errors, but it makes it easier to detect if code has been tampered with.

If digital signing is used to authenticate the execution result the server will have to be provided with means for checking the digital signature in order to be able to verify the result as correct.

Thus the present invention makes it easier to detect tampering. If a result of execution of a critical code portion that the server receives is not authenticated correctly, the server can suspect that some kind of tampering has taken place and that the result is unreliable.

As mentioned above it is advantageous if the execution results are time-stamped in the secure execution units. The server can then detect if there is an attempt to pass an old execution result for a new execution result, a so-called replay attack. The present invention can provide an additional possibility of detecting tampering if the critical code portions to be executed in the secure execution unit are provided with sequence numbers that are indicative of the order in which the code portions are to be executed. The sequence number of a critical code portion can then be appended to the execution result before it is authenticated with the secret key. The server can check the sequence number when it verifies the result and may thereby detect if tampering has occurred that causes the results from the critical code portions to arrive out of order.

If the non-critical code portions of the application 5 has been tampered with in such a way that it endangers the security and integrity of service, it may be discovered by the server by the fact that the critical code portion (or portions) is not executed, or is executed in a way not expected by the service provider. The present invention facilitates detection of tampering. Particularly the above-mentioned embodiment that uses sequence numbers when authenticating the execution result provides excellent means for detecting tampering.

Figure 3:
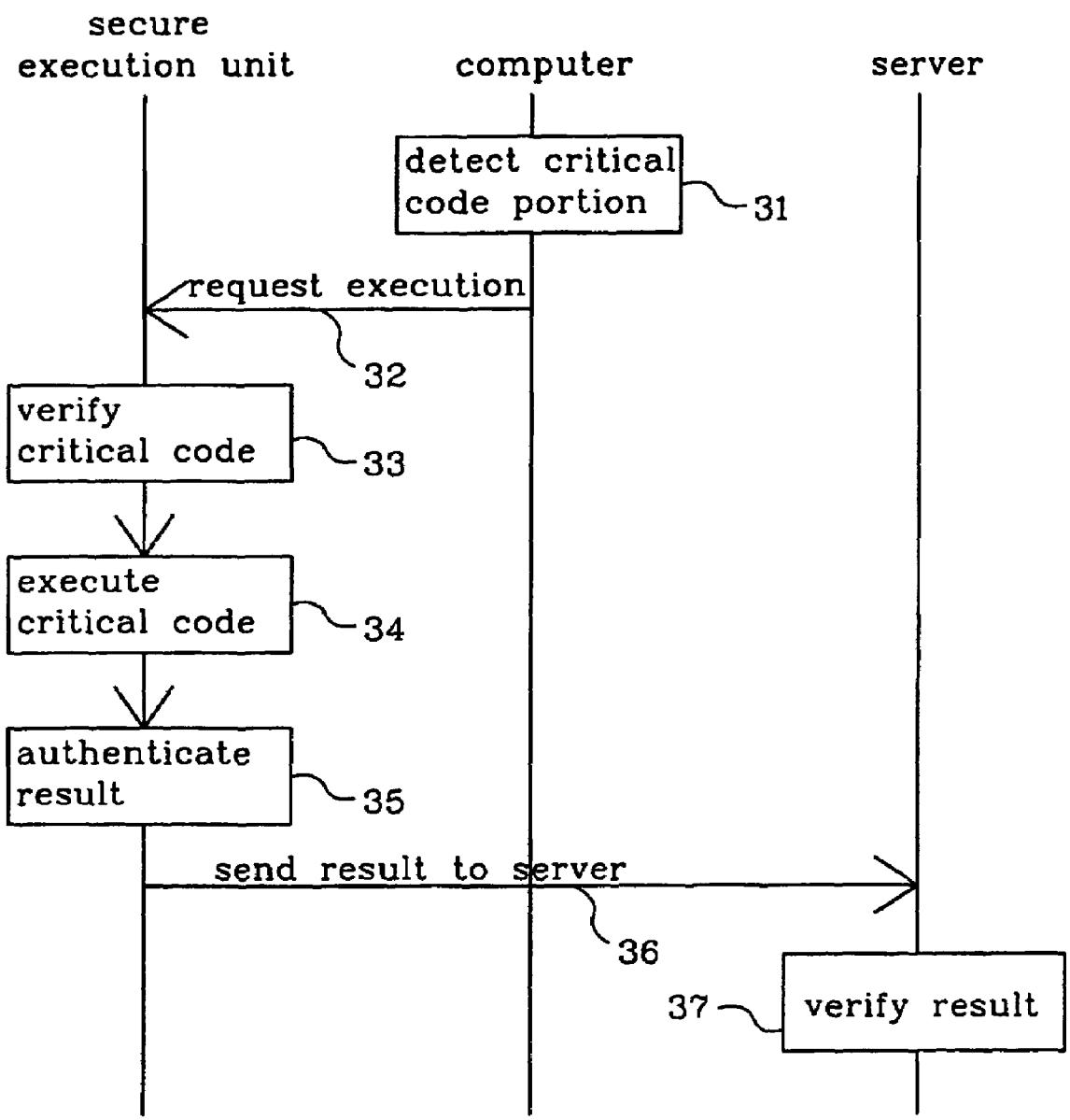
FIG. 3 is a combined flow diagram and sequence diagram that illustrates a method for executing computer code according to the present invention.

A method for executing code according to the invention will now be described with reference to the diagram of FIG. 3. According to the invention non-critical code portions will be executed in the normal execution means of the computer. The special features of the invention occur when it is detected that a critical code portion needs to be executed. The application 5 that runs on the computer 3 detects in a step 31 that a critical code portion is to be executed. The code portion will be recognised as critical since it is marked as such as explained above. Note however that the need to execute the critical code portion may be dictated by the server. The application 5 may thus detect that the critical code portion is to be executed by means of receiving a request to that effect from the server 2.

The application then sends a request to the secure execution unit to execute the critical code portion, step 32. The request may contain the critical code portion itself or simply information that identifies the critical code portion depending on how the critical code portions are stored (see discussion above). Depending on the code portion it may or may not be required to include parameters to the critical code portion in the request that is sent to the secure execution unit.

It is preferred that the secure execution unit verifies that the critical code has not been tampered with, and that it has been issued by the service provider, by verifying a digital signature of the critical code portion, step 33. If the service provider has encrypted the critical code portion, the secure execution unit 4 decrypts the critical code portion in this step.

Provided the signature of the code portion was verified as valid, the critical code portion is executed in the secure execution unit 4 in a next step 34. Any supplied parameters are used as input.

In a subsequent step 35, the result of the execution, together with information that uniquely identifies the critical code portion and preferably also a time stamp and sequence number, is encrypted and/or digitally signed in the secure execution unit, using the secret key 7. The signed and/or encrypted result can then be forwarded to the server, normally via the application on the computer, step 36. The server can verify that the critical code portion has been executed and that it can be trusted as correct, simply by means of decrypting the result and/or verifying the digital signature of the result, step 37. If the result has been time stamped, the server also checks the time stamp to detect replay attacks, and if a sequence number has been appended to the result, the server also checks the sequence number.

The method described above does not check the validity of any input parameters to the critical code portion. If the non-critical code has been tampered with, it may supply malicious parameters to the critical code resulting in useless or possibly harmful results. This can be remedied in several ways.

One way is to include code in the critical code portions that verifies the input parameters before the main part of the critical code portion is executed.

Another way of verifying input parameters is to include policies for each service in the secure execution unit that contains constraints on what the input parameters validly may be. These constraints may be used in the step 33 to verify the input parameters to the critical code portion prior to execution.

Figure 4:
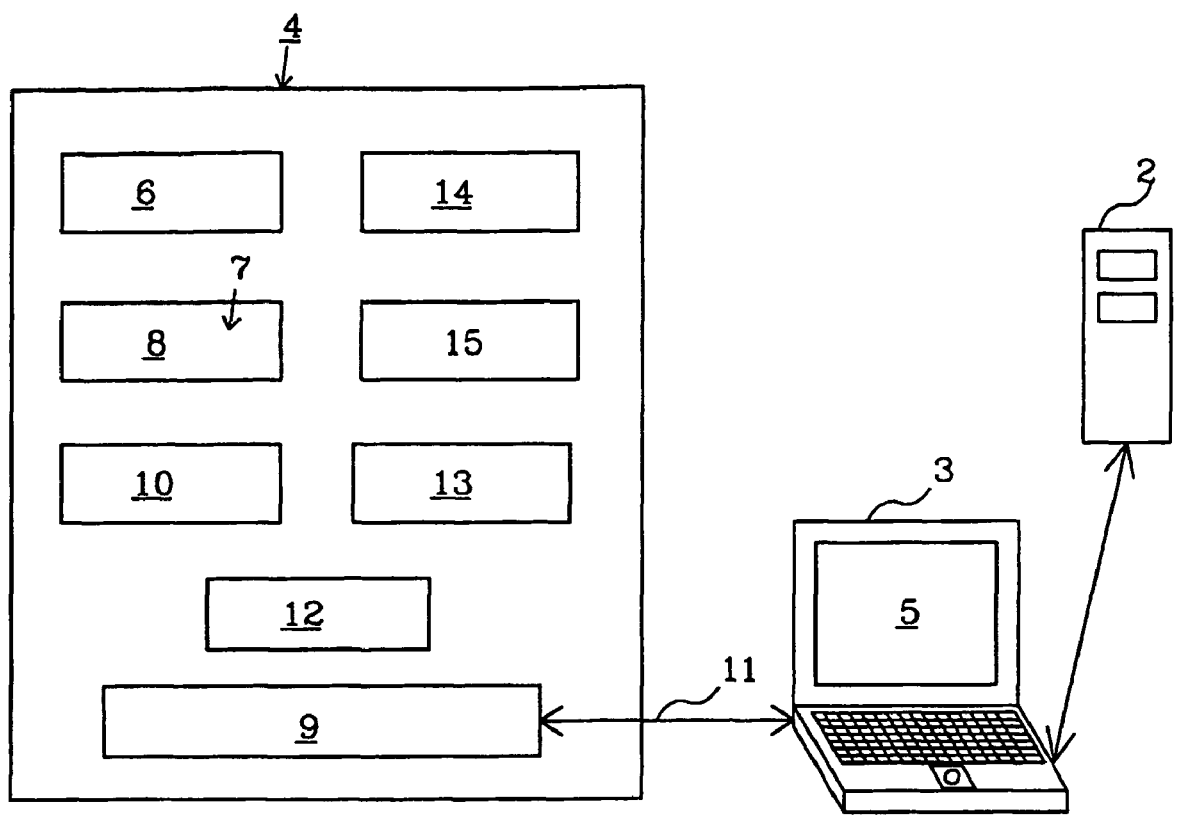
FIG. 4 is a schematic block diagram that shows a client-server system as that includes a secure execution unit according to an alternative embodiment of the present invention.

Yet another way of verifying input parameters is to provide the secure execution unit with a display 14 and an input device 15, as shown in FIG. 4, enabling the user to visually inspect and verify the validity of the input parameters before the critical code portion is executed. In this way the user is given much more control over the process, which increases the user's confidence in the result. This also increases the service provider's trust in the result, since the service provider knows that the result is based on parameters acknowledged by the user. The input device 15 may optionally be arranged such that the user can correct any input parameter which he finds is incorrect.

It is very important that the secure execution unit is the only unit that knows or has stored the secret key 7. The secret key 7 will be the private key in a public-private key pair, and the public key that matches the secret key 7 will be known by the server so that the server can use it to verify the execution result The secret key must be stored in the secure execution unit in such a way that it is unavailable to the user or the computer 3. It is possible that the secure execution unit contains several secret keys 7 that are used with different applications 5 and for different purposes.

The secure execution unit can be implemented in many different ways. It may for instance be incorporated in the same body as the computer or as a completely separate unit. It is also possible to construct the vital parts of the secure execution unit as a single chip that is incorporated in another device, e.g. a mobile phone or a PDA (Personal Digital Assistant).

The present invention has been described above with reference to a client-server system. However, the present invention is also applicable in other types of systems where it is of interest to increase the level of trust between different parts of the system. The present invention is for instance also applicable in a peer-to-peer system, in which either one or both of the peers may be provided with a secure execution unit according to the present invention.

The invention claimed is:

1. A system for executing code, the code comprising critical code portions and non-critical code portions, wherein the system comprises:
   a computer having at least one application,
   a secure execution unit connected to the computer, wherein the secure execution unit includes:
   means for executing the critical code portions,
   means for storing a secret key known only to the secure execution unit, and
   means for authenticating a result of an executed critical code portion using the secret key;
   wherein the at least one application is arranged to send a request to the secure execution unit to execute a first critical code portion.

2. The system according to claim 1, wherein the secure execution unit includes means for checking a digital signature of the first critical code portion.

3. The system according to claim 2, wherein the secure execution unit also includes communications means for forwarding the authenticated result to a server.

4. The system according to claim 3, wherein the secure execution unit also includes communications means for forwarding the authenticated result to the application on the computer.

5. The system according claim 4, wherein the secure execution unit includes a clock unit and means for time stamping the result.

6. The system according to claim 5, wherein the means for authenticating the result includes digital signing means.

7. The system according to claim 6, wherein the means for authenticating the result includes encryption means.

8. The system according to claim 7, wherein the application is arranged to include at least one parameter of the first critical code portion in the request to the secure execution unit.

9. The system according to claim 8, wherein the secure execution unit includes:
   a memory for storing at least one predetermined constraint of the at least one parameter; and
   means for comparing the parameter with the at least one predetermined constraint.

10. The system according to claim 8, wherein the secure execution unit includes a display and an input device, and the secure execution unit is arranged to display the at least one parameter on the display.

11. The system according to claim 10, wherein the secure execution unit is a hardware unit that is separate from the hardware of the computer, and wherein the secure execution unit and the computer include communications interfaces for communicating with each other.

12. The system according to claim 10, wherein the secure execution unit is incorporated in the same chassis as the computer.

13. A processing system including a first subsystem and a second subsystem, wherein at least the first subsystem comprises:
   a computer having at least one application;
   a secure execution unit connected to the computer, wherein the secure execution unit includes:
   means for executing the critical code portions;
   means for storing a secret key known only to the secure execution unit; and
   means for authenticating a result of an executed critical code portion using the secret key;
   wherein the at least one application is arranged to send a request to the secure execution unit to execute a first critical code portion.

14. The processing system according to claim 13, wherein at least the second system includes means for checking an authenticated result of an execution of a critical code portion in the secure execution unit and verifying that the execution was carried out in a trusted way.

15. The processing system according to claim 13, wherein the secure execution unit includes means for checking a digital signature of the first critical code portion.

16. The system according to claim 15, wherein the secure execution unit also includes communications means for forwarding the authenticated result to a server.

17. The system according to claim 16, wherein the secure execution unit also includes communications means for forwarding the authenticated result to the application on the computer.

18. The system according to claim 17, wherein the secure execution unit includes a clock unit and means for time stamping the result.

19. The system according to claim 18, wherein the means for authenticating the result includes digital signing means.

20. The system according to claim 19, wherein the means for authenticating the result includes encryption means.

21. The system according to claim 20, wherein the application is arranged to include at least one parameter of the first critical code portion in the request to the secure execution unit.

22. The system according to claim 21, wherein the secure execution unit includes:
   a memory for storing at least one predetermined constraint of the at least one parameter; and
   means for comparing the parameter with the at least one predetermined constraint.

23. The system according to claim 21 wherein the secure execution unit includes a display arranged to display the at least one parameter prior to execution of the first critical code portion.

24. The system according to claim 23, wherein the secure execution unit is a hardware unit that is separate from the hardware of the computer, and wherein the secure execution unit and the computer include communications interfaces for communicating with each other.

25. The system according to claim 23, wherein the secure execution unit is incorporated in the same chassis as the computer.

26. A method for executing code having critical code portions and non-critical code portions, wherein the method includes the step of executing at least a first non-critical code portion on a computer, said method further comprising the steps of:
- detecting by an application on the computer, a first critical code portion to be executed;
- sending by the application, a request to a secure execution unit to execute the first critical code portion;
- executing by the secure execution unit, the first critical code portion in response to the request; and
- authenticating by the secure execution unit, the result of the execution of the first critical code portion using a secret key known only to the secure execution unit.

27. The method according to claim 26, further comprising the step of verifying by the secure execution unit, the authenticity of the first critical code portion before executing it, said verifying step including checking a digital signature of the first critical code portion.

28. The method according to claim 26, wherein the step of authenticating the result includes signing the result digitally using the secret key.

29. The method according to claim 26, wherein the step of authenticating the result includes encrypting the result using the secret key.

30. The method according to claim 26, wherein the step of sending the request to the secure execution unit to execute the first critical code portion includes sending by the application, at least one parameter of the first critical code portion in the request to the secure execution unit.

31. The method according to claim 30, further comprising the step of the secure execution unit checking the validity of the at least one parameter by comparing the parameter with at least one predetermined constraint.

32. The method according to claim 30, further comprising the step of the secure execution unit displaying the at least one parameter on a display in order for a user to visually inspect the validity of the parameter.

33. The method according to claim 26, further comprising the steps of:
- forwarding the authenticated result from the secure execution unit to a foreign system;
- checking the result by the foreign system; and
- verifying that the execution was carried out in a trusted way.

34. The method according to claim 33, wherein the step of forwarding the authenticated result to the foreign system includes forwarding the authenticated result via the application on the computer.

35. The method according claim 33, further comprising the steps of:
- time stamping the result by the secure execution unit; and
- checking the time stamp of the result by the foreign system when the execution is verified to have been carried out in a trusted way.

* * * * *